United States Patent
Rubinstein et al.

(10) Patent No.: US 7,600,928 B2
(45) Date of Patent: Oct. 13, 2009

(54) SYSTEM AND METHOD FOR PERFORMING AND PROTECTING HYBRID LINE SPLICES

(75) Inventors: Scott Rubinstein, League City, TX (US); Robert Speer, Spring, TX (US); Gilbert Flores, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/735,543

(22) Filed: Apr. 16, 2007

(65) Prior Publication Data

US 2007/0237467 A1    Oct. 11, 2007

Related U.S. Application Data

(63) Continuation-in-part of application No. 10/904,712, filed on Nov. 24, 2004, now Pat. No. 7,220,067.

(60) Provisional application No. 60/555,903, filed on Mar. 24, 2004.

(51) Int. Cl.
*G02B 6/255* (2006.01)
(52) U.S. Cl. .................................. 385/99; 385/100
(58) Field of Classification Search ............. 385/98–99, 385/135–136
See application file for complete search history.

(56) References Cited

U.S. PATENT DOCUMENTS

| | | | | |
|---|---|---|---|---|
| 2,788,385 A | * | 4/1957 | Doering et al. ............... 174/92 |
| 3,290,428 A | * | 12/1966 | Yonkers ..................... 174/73.1 |
| 3,912,854 A | * | 10/1975 | Thompson et al. ......... 174/88 C |
| 3,916,086 A | * | 10/1975 | Gillemot et al. ................ 174/93 |
| 4,084,066 A | * | 4/1978 | Gillemot ....................... 174/92 |
| 4,084,067 A | * | 4/1978 | Gillemot ....................... 174/92 |
| 4,262,167 A | * | 4/1981 | Bossard et al. ................ 174/92 |
| 4,348,076 A | * | 9/1982 | Oldham ....................... 385/69 |
| 4,387,268 A | * | 6/1983 | Morel et al. .................. 174/92 |
| 4,512,628 A | * | 4/1985 | Anderton .................... 385/135 |
| 4,580,874 A | * | 4/1986 | Winter et al. ................. 385/99 |
| 4,603,737 A | * | 8/1986 | Spikes ..................... 166/241.7 |
| 4,721,355 A | * | 1/1988 | Gould ........................ 385/76 |
| 4,744,622 A | * | 5/1988 | Cherry et al. ................. 385/87 |
| 4,773,728 A | * | 9/1988 | Kershaw ...................... 385/99 |
| 4,822,954 A | * | 4/1989 | Rebers et al. ................. 174/93 |
| 4,838,640 A | * | 6/1989 | Anderton .................... 385/135 |

(Continued)

FOREIGN PATENT DOCUMENTS

GB    2385214 A    8/2003

(Continued)

*Primary Examiner*—Frank G Font
*Assistant Examiner*—Peter Radkowski
(74) *Attorney, Agent, or Firm*—Daryl R. Wright; James L. Kurka (57) ABSTRACT

A method for providing a protected splice in a hybrid cable that has a fiber optic line and an electrical line includes the steps of providing an optic splice in the fiber optic line; providing a electrical splice in the electrical line proximate to the optic splice; connecting a tube over the optic splice; installing a boot over the electrical splice; disposing the tube and the boot in a slotted sleeve; positioning the slotted sleeve within a housing; and anchoring the housing to the hybrid cable on opposing sides of the splices.

18 Claims, 7 Drawing Sheets

U.S. PATENT DOCUMENTS

| | | | |
|---|---|---|---|
| 4,857,672 A * | 8/1989 | Rebers et al. | 174/93 |
| 5,082,346 A * | 1/1992 | Myers | 385/54 |
| 5,201,019 A * | 4/1993 | Gallusser et al. | 385/99 |
| 5,249,246 A * | 9/1993 | Szanto | 385/96 |
| 5,448,669 A * | 9/1995 | Dunn et al. | 385/101 |
| 5,749,756 A * | 5/1998 | Vockroth et al. | 439/879 |
| 5,894,536 A * | 4/1999 | Rifkin et al. | 385/99 |
| 5,997,186 A * | 12/1999 | Huynh et al. | 385/99 |
| 6,273,621 B1 * | 8/2001 | Eslambolchi et al. | 385/95 |
| 6,545,221 B1 | 4/2003 | Halpert | |
| 6,571,046 B1 | 5/2003 | Hickey et al. | |
| 6,881,079 B2 | 4/2005 | McHugh et al. | |
| 6,931,194 B2 | 8/2005 | Dowd et al. | |
| 7,154,413 B2 | 12/2006 | Veneruso | |
| 2003/0111796 A1 * | 6/2003 | Kohli et al. | 277/322 |
| 2005/0213898 A1 | 9/2005 | Rubinstein | |
| 2005/0281511 A1 | 12/2005 | Ringgenberg | |
| 2006/0000618 A1 | 1/2006 | Cho et al. | |
| 2007/0127875 A1 * | 6/2007 | Allen et al. | 385/95 |

FOREIGN PATENT DOCUMENTS

GB     2412507 A     9/2005

* cited by examiner

SYSTEM AND METHOD FOR PERFORMING AND PROTECTING HYBRID LINE SPLICES

RELATED APPLICATIONS

This application is a continuation-in-part of U.S. application Ser. No. 10/904,712, filed Nov. 24, 2004, which claims the benefit of U.S. Provisional Application No. 60/555,903, filed Mar. 24, 2004.

FIELD OF THE INVENTION

The subject matter of the present invention relates to splicing and protecting hybrid communication lines from the surrounding environment.

BACKGROUND

Communication lines are used in a wide range of applications in the oilfield industry. The communication lines transmit monitored data regarding downhole conditions such as temperature and pressure to surface instrumentation. The communication lines can also be used to send information down the well from the surface. Additionally, communication lines may also be used to electrically power downhole equipment. Communication lines may include electrical conduits, optical fibers, hydraulic lines and other methods for data or power transmission. Hybrid cables may include multiple types of communication lines in the same cable package, e.g., both electrical conductors and optical fibers.

In environments such as those encountered in downhole wells, the communication lines are exposed to hostile conditions such as elevated temperatures and pressures. To protect the fragile communication lines from the hostile conditions, the communication lines are generally carried within protective tubing that provides an environmental seal. Problems arise when the seal must be broken during assembly, installation and/or repair of the communication line. For example, in downhole applications, in order for the communication line to be fed through production equipment such as packers, the line must be cut and then spliced with the downstream line. Thus, after splicing, the communication line must once again be sealed from the harsh environment.

Hybrid cables may contain multiple optical fibers that may need to be spliced. For example, c conventional fusion splicing requires each optical fiber to be separately prepared (e.g., cutting to length, stripping the buffer material, cleaving, cleaning, etc.) and then separately fusion spliced. Each fusion splice multiplies the time it takes to complete the assembly, often at the expense of valuable rig time and adding to the installer's fatigue, which increases the installation risk. Moreover, in space restricted packaging configurations, such as hybrid cables, the individual spliced fibers typically need to be kept to near identical lengths. Therefore, all the individual fusion splices need to be successful (e.g., free of flaws and with low optical loss), or otherwise all the fibers will need to be restored to the same length, thereby necessitating breaking any previously successful splices. In addition to the lost time, the process of redoing the splices may move the position of the assembly to the detriment of the completion design, or even result in insufficient cable length to complete the assembly.

Therefore, there is a need for a method of splicing hybrid cables and an apparatus for protecting the hybrid splice from the surrounding environment.

SUMMARY OF THE INVENTION

In view of the foregoing and other considerations, embodiments of the present invention relate to methods and apparatus for performing a hybrid cable splice and for protecting the splice from the downhole environment and mechanical stresses.

An embodiment of a method for providing a protected splice in a hybrid cable that has a fiber optic line and an electrical line includes the steps of providing an optic splice in the fiber optic line; providing a electrical splice in the electrical line proximate to the optic splice; connecting a tube over the optic splice; installing a boot over the electrical splice; disposing the tube and the boot in a slotted sleeve; positioning the slotted sleeve within a housing; and anchoring the housing to the hybrid cable on opposing sides of the splices.

An embodiment of a method for providing a protected splice in a hybrid cable in a wellbore environment, wherein the hybrid cable has a fiber optic line and an electrical line includes the steps of connecting the hybrid cable to a tubing for positioning in a wellbore; providing an optic splice in the fiber optic line; providing a electrical splice in the electrical line proximate to the optic splice; connecting a tube over the optic splice; installing a boot over the electrical splice; disposing the tube and the boot in a slotted sleeve; positioning the slotted sleeve within a housing; hydraulically sealing the housing about the hybrid cable; and anchoring the housing to the hybrid cable on opposite sides of the splices.

An embodiment of an assembly for use in a wellbore includes a hybrid cable having a fiber optic line and an electrical line, the fiber optic line having an optical splice and the electrical line having an electrical splice; a tube secured over the optic splice; a boot secured over the electrical splice; a slotted sleeve containing the tube and the boot; a housing containing the slotted sleeve; and means for anchoring the housing to the hybrid cable on opposing sides of the splices.

The foregoing has outlined the features and technical advantages of embodiments of the present invention in order that the detailed description of illustrative embodiments of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Refer now to the drawings wherein depicted elements are not necessarily shown to scale and wherein like or similar elements are designated by the same reference numeral through the several views.

As used herein, the terms "up" and "down"; "upper" and "lower"; and other like terms indicating relative positions to a given point or element are utilized to more clearly describe some elements of the embodiments of the invention. Commonly, these terms relate to a reference point as the surface from which drilling operations are initiated as being the top point and the total depth of the well being the lowest point.

In the following detailed description of the subject matter of the present invention, the apparatus and method of protecting and performing splices for hybrid lines is principally described with reference to downhole well applications. In addition to downhole well applications, the present invention can be used with any number of applications such as pipeline monitoring, subsea well monitoring, and data transmission, for example.

Figure 1:
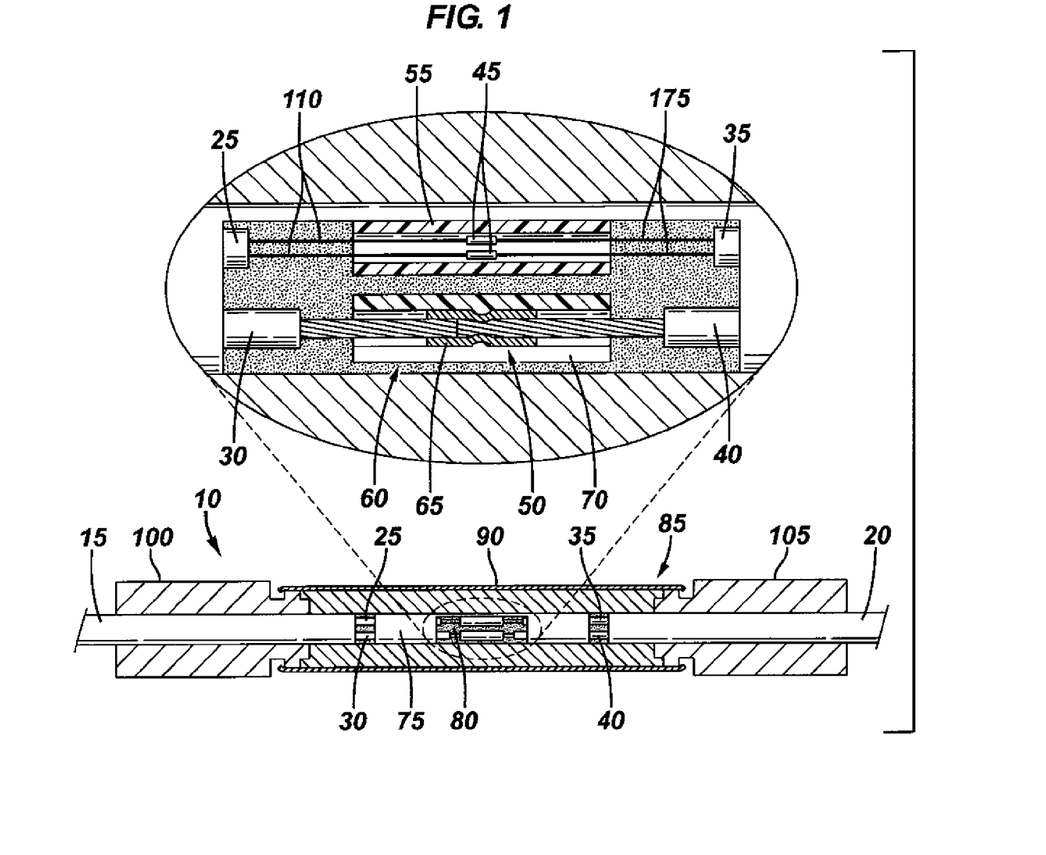
FIG. 1 is a partial cross-sectional view of an embodiment of a hybrid line splice assembly of the present invention.

FIG. 1 is a cross-sectional view of an embodiment of a hybrid line splice assembly for protecting a hybrid line splice, generally denoted by numeral 10, of the present invention. A hybrid line may need to be spliced, either by design or pursuant to repairing a damaged communication line or downhole component. Hybrid line splice assembly 10 protects these splices from the mechanical and thermal loads occurring during and after installation and isolates the splices from the downhole environment to ensure that the communication lines function properly. For example, for a typical hybrid line comprising optical fibers and electrical conductors, the splices must be protected to ensure that optical continuity and specified optical insertion losses are maintained, as well as electrical continuity and insulation resistance of the copper conductor.

Hybrid lines 15 and 20 each include at least two different types of communications lines. Hybrid lines 15 and 20 may be hybrid cables or transfer tubes, for example. In the following detailed description, first hybrid line 15 includes a first communication line 25 comprising a first fiber optic communication line and a second communication line 30 comprising a first electrical conductor communication line. Similarly, second hybrid line 20 includes a third communication line 35 comprising a second fiber optic communication line and a fourth communication line 40 comprising a second electrical conductor communication line.

Fiber optic communication lines 25 and 35 include one or more optical fibers 110 and 175, respectively. Fiber optic communication lines 25 and 35 may comprise a loose tube design, for example. The fiber overstuff afforded by a loose tube design may prevent optical fiber strain from differential thermal expansion between optical fibers 110 and 175 and the remainder of lines 25 and 35, and therefore may preclude the necessity of anchoring the optical fibers 110 and 175. This may reduce the complexity of assembly 10 and may eliminate a potential source of increased attenuation or fiber breaks from using setting compounds for fiber anchoring.

As shown in FIG. 1, first hybrid line 15 is spliced to second hybrid line 20 to form a single hybrid cable or line. Optic fibers 110 and 175 are optically coupled via first splice 45 (which may comprise multiple splices of multiple optic fiber pairs). Electrical conductors 30 and 40 are electrically coupled via second splice 50. Hybrid line splice assembly 10 includes fiber optic splice protection sleeve or tube 55 to house and protect fiber optic splices 45 and optical fibers 110 and 175, e.g., to minimize shock, vibration, abrasion damage or bending that could either cause optical losses or a break. Fiber optic splice protection sleeve 55 may comprise any suitable material, including, for example, a polyimide tube. During the splicing process, optical fibers 110 may be positioned through fiber splice protection sleeve 55. Fiber splice protective sleeve 55 may be of a selected material, size and length to allow sleeve 55 to be inserted into fiber optic communication line 25 or 35. Once the optical fibers 110 and 175 are spliced, fiber optic splice protection sleeve 55 may be slid over and past the splices 45 (e.g., fusion splices). Accordingly, fiber splice protection sleeve 55 may be used to facilitate the splicing of multiple optical fibers 110 and 175 and may also serve to protect the optical fiber splices 45 once the splices are completed.

Hybrid cable splice assembly 10 includes boot assembly 60 to house and protect second splice 50. Second splice 50 may comprise crimp socket 65 to communicatively couple the ends of electrical conductors 30 and 40. Other means of providing a terminal or contact to splice the ends of electrical conductor 30 and 40 may be used. Boot assembly 60 includes electrical splice boot 70 to house and protect crimp socket 65 and thereby protect second splice 50. The materials of boot assembly 60 are preferably selected to minimize the possibility of an electrical short.

Hybrid cable splice assembly 10 includes slotted sleeve or tube 75 to house, anchor and protect the first and second splices 45 and 50. Slotted sleeve 75 is sized to contain both first and second splices 45 and 50, e.g., in length and diameter. Slotted sleeve 75 may hold or contain protective gel 80 to anchor and protect first and second splices 45 and 50. Protective gel 80 may be a gel or fluid operable to provide protection against contaminants captured inside assembly 10 during its assembly. For example, protective gel 80 may comprise a hydrogen scavenging gel to absorb any hydrogen that may obscure or darken optical fibers 110 and 175. Protective gel 80 may be used to dampen mechanical stresses. For example, slotted sleeve 75 may be filled with Sepigel or similar material.

Hybrid line splice assembly 10 further includes hybrid cable splice (HCS) housing 85 to house and protect slotted sleeve 75. HCS housing 85 may include galvanic protection layer 90 or similar coating to mitigate corrosion. Hybrid line splice assembly 10 includes first seal assembly 100 and second seal assembly 105. Seal assemblies 100 and 105 may be coupled to HCS housing 85 to provide a seal about the ends of HCS housing 85 and secure slotted sleeve 75. Seal assemblies 100 and 105 substantially limit the exposure of splices 45 and 50 to the downhole environment, e.g., fluids, temperature. Seal assemblies 100 and 105 may locally reduce the outer diameter of hybrid lines 15 and 20, respectively. This restriction may increase the load needed to move communication lines 25, 30, 35 and 40, and thereby provide a form of anchoring to prevent movement that may damage the first and second splices 45 and 50. Sealing assemblies 100 and 105 may include the sealing assembly disclosed in U.S. Pat. No. 6,752, 397 to Kohli, et al., such as a redundant metal-metal seal, for example. Sealing assemblies 100 and 105 may comprise an electrical dry-mate connector (EDMC) cable seal assembly, for example.

Figure 2:
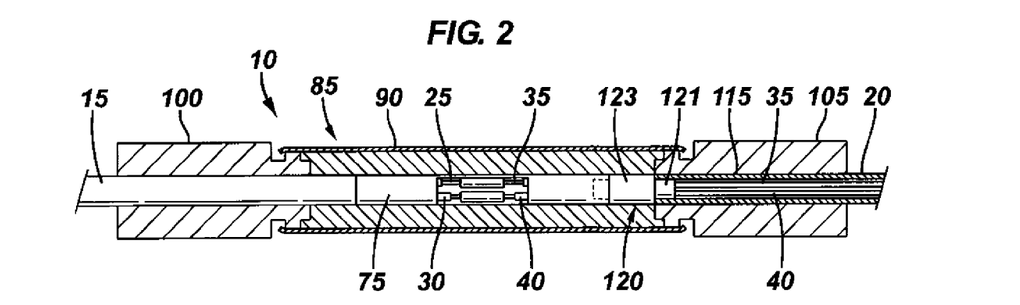
FIG. 2 is partial cross-sectional view an embodiment of a hybrid line splice assembly including a transfer tube.

FIG. 2 is a cross-section view of hybrid line splice assembly 10 wherein second hybrid line 20 comprises a transfer tube 115. Hybrid line splice assembly 10 houses and protects the splice of hybrid lines 15 and 20 and the connection with transfer tube 115. Unlike conventional hybrid cables, transfer tube 115 typically does not include cable filler material. Thus, hybrid line splice assembly 10 includes a novel transfer tube adapter 120. Transfer tube adaptor 120 may serve as a support for slotted sleeve 75 in place of the cable filler material, for example, and may provide mechanical isolation of communication lines 35 and 40 in order to prevent loads from being transmitted to the splices 45 and 50 (FIG. 1). For example, in the absence of a cable filler, transfer tube 115 may transmit potentially damaging vibration or shock related loads to splices 45 and 50. As shown in FIG. 2, transfer tube adaptor 120 may include a neck portion 121 and an expand region 123 having larger diameter than neck portion 121. Neck portion 121 may be inserted into and received by transfer tube 115 with expanded region 123 positioned inside of slotted 75. In this manner, slotted sleeve 75 is supported in a manner to protect splices 45 and 50.

Figure 3:
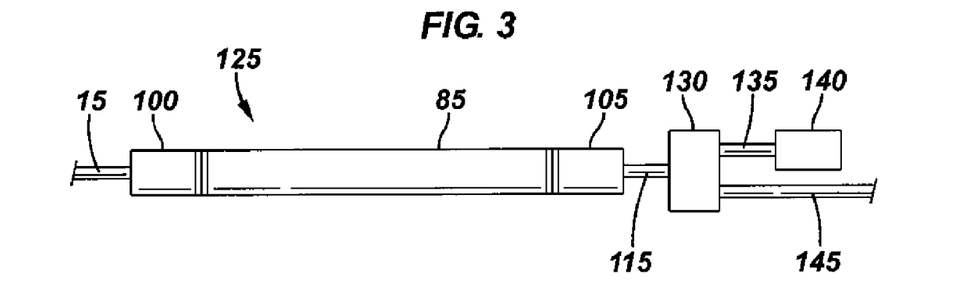
FIG. 3 is a schematic of an embodiment of a downhole system using a downhole hybrid line splice assembly of the present invention.

Refer now to FIG. 3, wherein hybrid line splice assembly 10 is utilized to connect the hybrid line 15 to one or more downhole devices positioned below the splices, via transfer tube 115. Electro-optic splitter (EOS) 130, or a similar device, splits electrical conductor 40 via conductor line 135 and fiber optic communication line 35 (FIG. 2) via optical fiber line 145. One or more electronic devices 140, such as electronic gauges, for example, may be connected to electrical conductor(s) 40 via separated conductor line 135. Meanwhile, optical fiber line 145 may continue further along the completion, e.g., further downhole.

Figure 4:
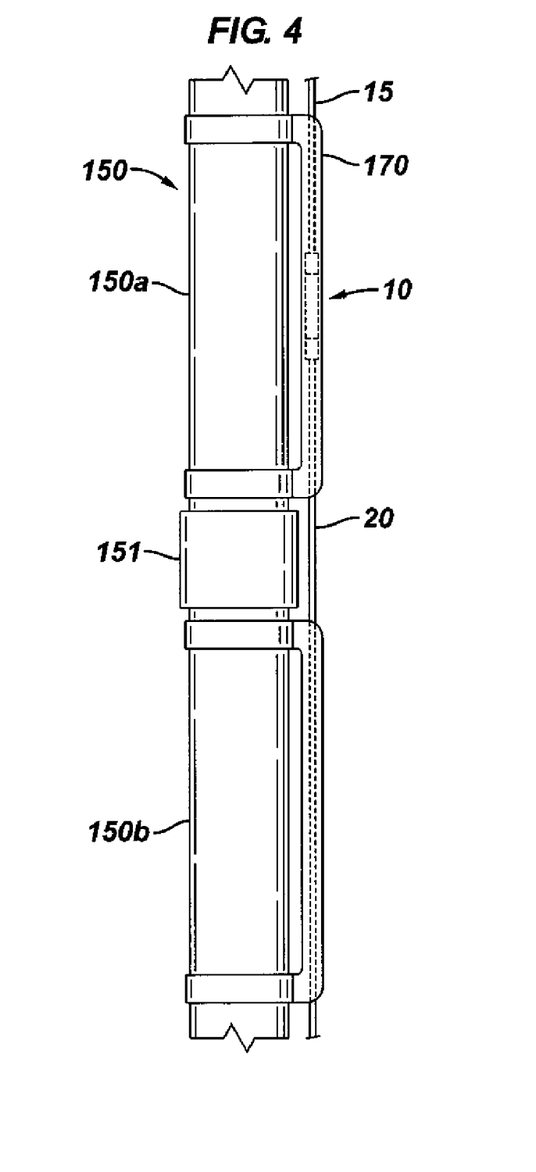
FIG. 4 is a schematic of an embodiment of a hybrid line splice assembly of the present invention positioned on a section of production tubing.
Figure 5:
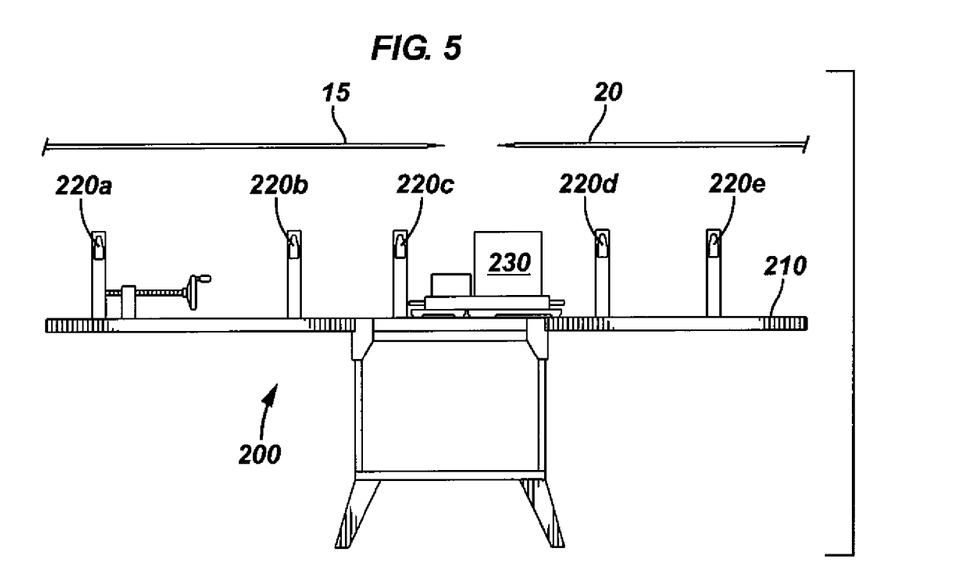
FIG. 5 is a schematic of an embodiment of a workstation for forming a hybrid cable splice of the present invention.

FIG. 4 is a schematic illustrating the connection and relative positioning of hybrid line splice assembly 10 on a production or tubing string 150 for positioning in a wellbore.

String 150 includes a first tubing joint 150a and a second tubing joint 150b interconnected at coupling 151. Hybrid cable 15, 20 is connected to tubing 150 with a cross-coupling splice clamp 170 to protect the cable splice while running into the wellbore and against loads on the cable and splice following installation in the wellbore. As illustrated in FIG. 4, hybrid cable splice 10 is positioned above tubing coupling 151. however, if a problem occurs with the installation of the hybrid cable splice 10 requiring additional length of the optical fibers, splice assembly 10 can be repositioned below coupling 151 making more fiber length available downhole by utilizing the cable length that passed over coupling 151.

FIGS. 5-13 illustrate an exemplary method for assembling a hybrid line splice assembly. Workstation 200 includes a jig 210 with posts 220a, 220b, 220c, 220d, 220e and a splicing device 230 (e.g., fusion splicer in this illustration enclosed in a purge box) for connecting splicing the optic fibers of first and second hybrid lines 15 and 20 together. Jig 210 may include a tray arranged between the posts 220a, 220b, 220c and the posts 220d, 220e for supporting the splicing device 230 and permitting it to slide into position to perform the fiber splice and back out of position to allow room to work without disturbing the fibers. While the embodiment described herein depicts a horizontally aligned jig, workstation 200 may be configured such that the splice process may be performed in a substantially vertical orientation against the side of the production tubing 150 (FIG. 4), to minimize the need for cable slack and workstation space. For example, workstation 200 may include clamps to secure jig 210 directly against the side of the production tubing.

Figure 6:
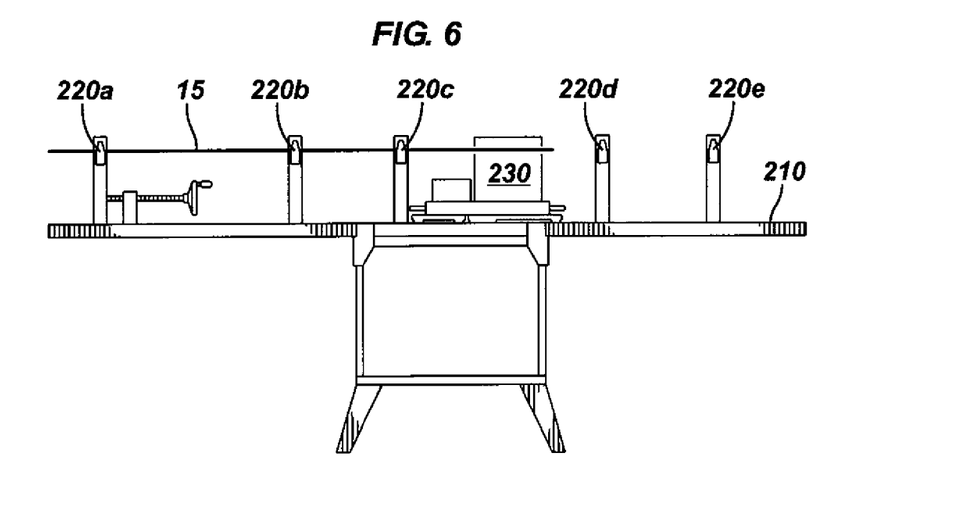
FIG. 6 is an illustration of a step in an embodiment of a method of providing a hybrid line splice of the present invention.
Figure 7:
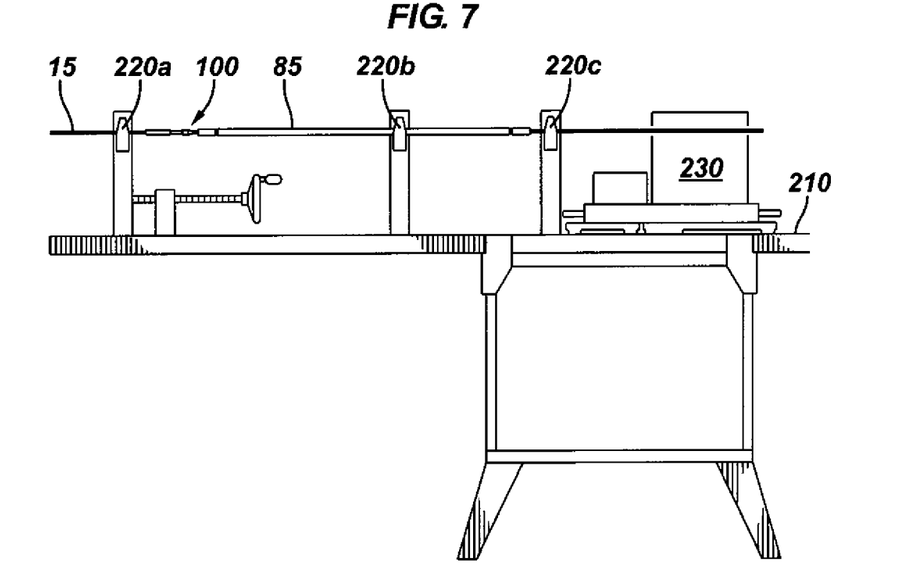
FIG. 7 is an illustration of another step in an embodiment of a method of providing a hybrid line splice of the present invention.

Referring to FIG. 6, first hybrid line 15 is positioned to extend a given length past the inner face of post 220c and is clamped into post 220a. Next, as shown in FIG. 7, first seal assembly 100 and HCS housing 85 are slid onto first hybrid line 15 past post 220c. The HCS housing 85 is held by post 220b with the first hybrid line 15 also held at 220c. If hybrid line 15 comprises a metal cable jacket and cable filler material, these protective layers may then be cut and/or removed a selected distance from the inner face of post 220c to expose communication lines 25 and 30.

Figure 8:
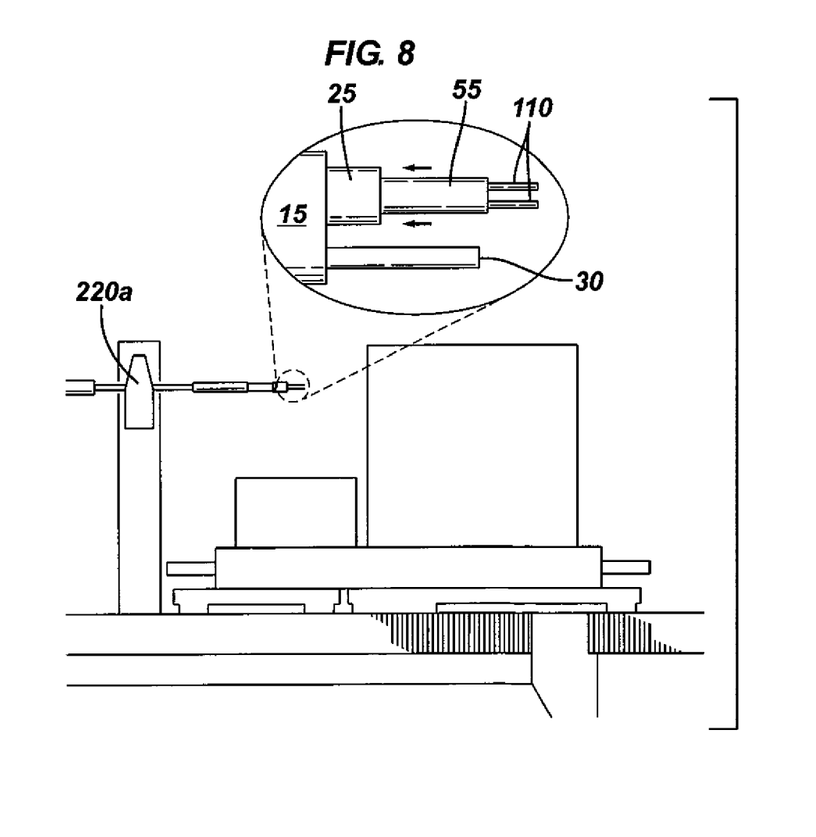
FIG. 8 is an illustration of another step in an embodiment of a method of providing a hybrid line splice of the present invention.

In FIG. 8, optical fibers 110 of first hybrid line 15 are prepared by removing or stripping a selected portion of first communication line 25, e.g., the fiber loose tube, to expose optical fibers 110. Fiber optic splice protection sleeve 55 is positioned over optical fibers 110 and into first communication line 25 such that a sufficient length of optical fibers 110 is left exposed for the splicing process.

Figure 9:
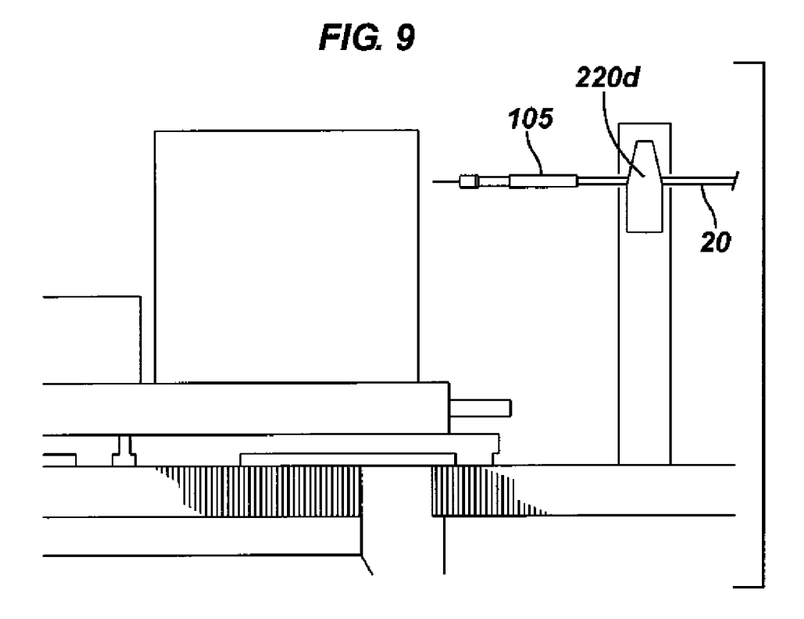
FIG. 9 is an illustration of another step in an embodiment of a method of providing a hybrid line splice of the present invention.

FIG. 9 illustrates the preparation of second hybrid line 20, which may be achieved using similar steps as described above with respect to first hybrid line 15. Second hybrid line 20 is loaded into position to extend a given length past the inner face of post 220d and is clamped onto post 220e. Second seal assembly 105 is slid onto second hybrid line 20. The metal jacket and filler material (if any) of second hybrid line 20 may be then cut and removed a given distance from the inner face of post 220d.

Figure 10:
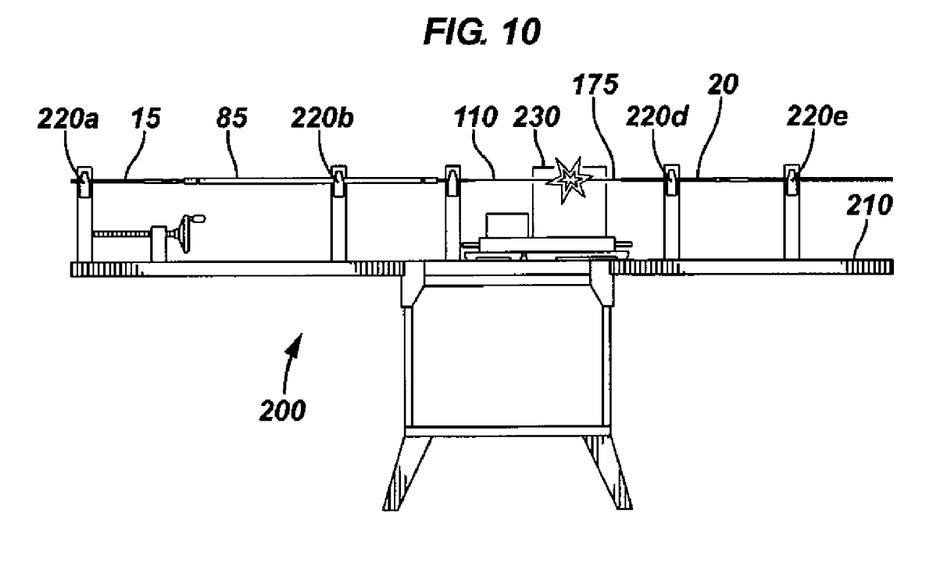
FIG. 10 is an illustration of another step in an embodiment of a method of providing a hybrid line splice of the present invention.

FIG. 10 illustrates the optical fiber splice. Workstation 200 may include a fiber cleaver (not shown) to cleave optical fibers 110 and/or 175 to substantially identical lengths. The optical fibers 110 and 175 may then be spliced using the splicing device 230. The splicing device 230 may be a conventional fusion splicer for example, such as the device disclosed by U.S. Patent Publication No. 2005/0276549 A1 to Tabata et al.

Figure 14A:
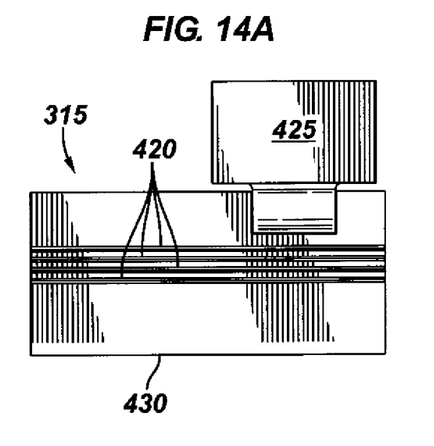
FIGS. 14A and 14B illustrate an embodiment of a novel optical fiber holder of the present invention for providing optical splices in individual optical fibers.
Figure 14B:
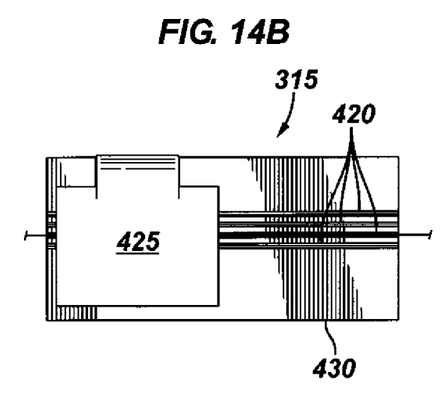

The splicing device 230 may be adapted to fusion splice for example, separate, individual pairs of optical fibers 110 and 175 in a substantially simultaneous manner. FIGS. 14A and 14B illustrate an optical fiber holder 315 of an embodiment of the present invention for substantially simultaneous fusion splicing of multiple optic fibers. Two optical fiber holders 315 secure and align the respective multiple optic fibers 110 and 175 of both fiber optic communication lines 25 and 35 in the splicing device 230. Optical fiber holder 315 comprises one or more V-grooves 420 along the surface of the main body 430. V-grooves 420 are selectively sized to allow each optic fiber 110 and 175 to be separately and individually positioned into its own V-groove 420. Optical fiber holder 315 may comprise hinged clamp 425 to cover a selected portion of the main body 430. FIG. 14A shows clamp 425 in an "open"

position whereby optical fibers 110 or 175 may be positioned within a V-groove 420. FIG. 14B shows clamp 425 in a "closed" position whereby the optical fibers 110 or 175 may be held in position within optical fiber holder 315. Once clamps 425 are closed, the splicing device 230 may align optic fibers 110 and 175 and fusion splice them, for example.

Figure 11:
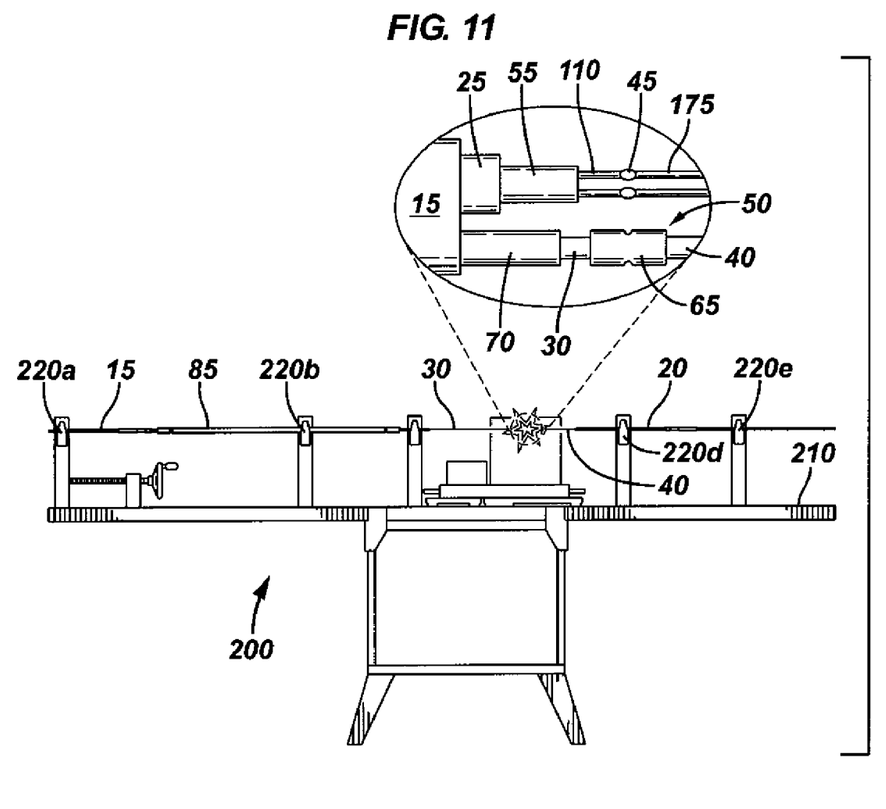
FIG. 11 is an illustration of another step in an embodiment of a method of providing a hybrid line splice of the present invention.

FIG. 11 illustrates an electrical conductor splice. Electrical splice boot 70 is positioned over one of the electrical conductors, 30 or 40, with a sufficient length exposed for splicing. The cut ends of electrical conductors 30 and 40 are then inserted into and communicatively coupled via crimp socket 65. Other means of providing an electrical splice between the electrical conductors 30 and 40 may be used. Once the connection between electrical conductor 30 and 40 has been made, electrical splice boot 70 may be slid over crimp socket 65 to complete boot assembly 60. Either before or after the electrical splice, fiber optic splice protection sleeve 55 may be slid over fiber optic splices 45 to protect the splices.

Figure 12:
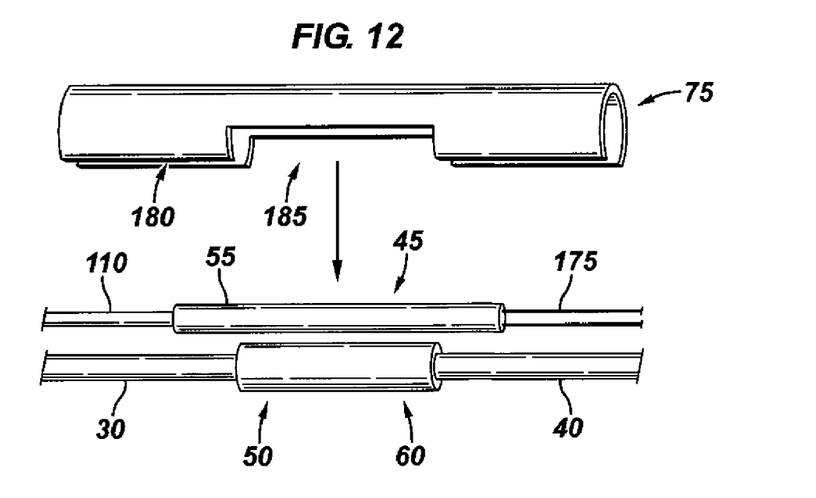
FIG. 12 is an exploded view of portion of an embodiment of a hybrid line splice of the present invention.
Figure 13:
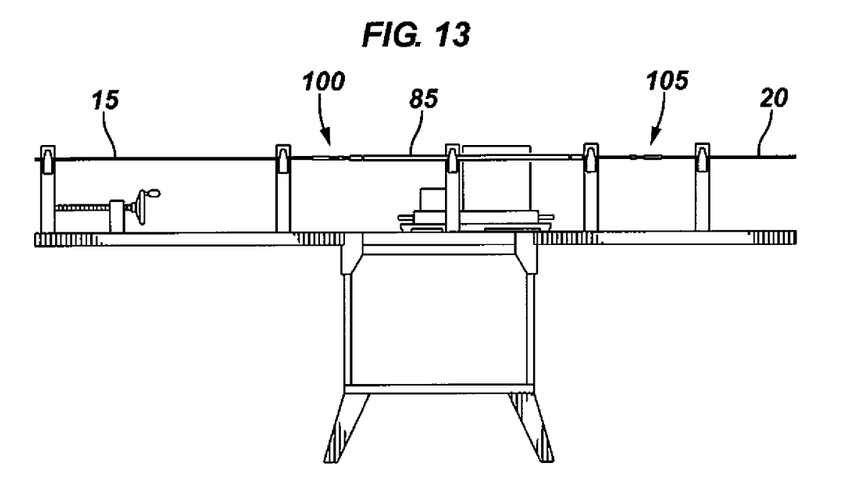
FIG. 13 is an illustration of another step in an embodiment of a method of providing a hybrid line splice of the present invention.

After first and second splices 45 and 50 are made, adjustable jig post 210 is moved outward along the jig to remove slack from the communication lines, but not so much as to put tension on the lines or break the splices 45 and 50. Then, as shown in FIG. 12, slotted sleeve 75 is carefully positioned over splices 45 and 50. Slotted sleeve 75 may comprise longitudinal slot or channel 180 sized to receive hybrid lines 15 and 20 into slotted sleeve 75. Slotted sleeve 75 may comprise aperture 185 sized to accommodate fiber optic splice protection sleeve 55 and boot assembly 60. Once slotted sleeve 75 has been positioned over splices 45 and 50, protective gel 80 may be injected into the slotted sleeve 75 to coat or suspend splices 45 and 50. As shown in FIG. 13, HCS housing 85 is then slid over slotted sleeve 75 and secured in a jig post. Seal assemblies 100 and 105 are then made up.

From the foregoing detailed description of specific embodiments of the invention, it should be apparent that an apparatus and method for performing and protecting hybrid line splices that are novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method for providing a protected splice in a hybrid cable that has a fiber optic line and an electrical line, the method comprising:
   providing an optic splice in the fiber optic line;
   providing an electrical splice in the electrical line proximate to the optic splice;
   connecting a tube over the optic splice;
   installing a boot over the electrical splice;
   disposing the tube and the boot in a slotted sleeve;
   positioning the slotted sleeve within a housing;
   anchoring the housing to the hybrid cable on opposing sides of the splices, wherein the hybrid cable includes a transfer tube; and
   interconnecting the transfer tube and the slotted sleeve via a transfer tube adapter, wherein the transfer tube adapter comprises a neck portion and an expanded diameter region, wherein the neck portion is disposed in the transfer tube and the expanded region is disposed within the slotted sleeve.

2. The method of claim 1, wherein the fiber optic line includes a plurality of individual and separate optic fibers, each optic fiber having an optic splice.

3. The method of claim 1, further including the step of disposing a gel within the slotted sleeve.

4. The method of claim 1, wherein the housing substantially transfers the axial load on the hybrid cable across the splices.

5. The method of claim 3, wherein the fiber optic line includes a plurality of individual and separate optic fibers, each optic fiber having an optic splice.

6. The method of claim 1, wherein the fiber optic line includes a plurality of individual and separate optic fibers, each optic fiber having an optic splice.

7. The method of claim 1, wherein the step of providing an optic splice includes providing a plurality of individual splices in separate optic fibers substantially simultaneously.

8. The method of claim 7, further including the step of disposing a gel within the slotted sleeve.

9. A method for providing a protected splice in a hybrid cable in a wellbore environment, wherein the hybrid cable has a fiber optic line and an electrical line, the method comprising:
   connecting the hybrid cable to a tubing for positioning in a wellbore;
   providing an optic splice in the fiber optic line;
   providing an electrical splice in the electrical line proximate to the optic splice;
   connecting a tube over the optic splice;
   installing a boot over the electrical splice;
   disposing the tube and the boot in a slotted sleeve;
   positioning the slotted sleeve within a housing;
   hydraulically sealing the housing about the hybrid cable;
   anchoring the housing to the hybrid cable on opposite sides of the splices, wherein the hybrid cable includes a transfer tube; and
   interconnecting the transfer tube and the slotted sleeve via a transfer tube adapter, wherein the transfer tube adapter comprises a neck portion and an expanded diameter region, wherein the neck portion is disposed in the transfer tube and the expanded region is disposed within the slotted sleeve.

10. The method of claim 9, wherein the optic splice comprises a plurality of individual splices in separate optical fibers performed substantially simultaneously.

11. The method of claim 9, wherein the optic splice comprises a plurality of individual splices in separate optical fibers performed substantially simultaneously.

12. An assembly for use in a wellbore, the assembly comprising:
   a hybrid cable having a fiber optic line and an electrical line, the fiber optic line having an optic splice and the electrical line having an electrical splice;
   a tube secured over the optic splice;
   a boot secured over the electrical splice;
   a slotted sleeve containing the tube and the boot;
   a housing containing the slotted sleeve;
   means for anchoring the housing to the hybrid cable on opposing sides of the splices;
   a transfer tube connected to a portion of the hybrid cable; and
   a transfer tube adapter comprising a neck portion and an expanded diameter region, wherein the neck portion is disposed in the transfer tube and the expanded region is disposed within the slotted sleeve.

13. The assembly of claim 12, wherein the hybrid cable is connected to the exterior of a tubing.

14. The assembly of claim 12, wherein the optic splice comprises a plurality of individual splices in separate optical fibers performed substantially simultaneously.

15. The assembly of claim 12, wherein the hybrid cable is connected to the exterior of a production string positioned in a wellbore.

16. The method of claim 1, wherein the optic splice is a fusion splice.

17. The method of claim 9, wherein the optic splice is a fusion splice.

18. The assembly of claim 12, wherein the optic splice is a fusion splice.

* * * * *